US010988615B2

(12) United States Patent
Yamada et al.

(10) Patent No.: US 10,988,615 B2
(45) Date of Patent: Apr. 27, 2021

(54) POLYAMIDE RESIN COMPOSITION AND MOLDED ARTICLE

(71) Applicant: MITSUBISHI ENGINEERING-PLASTICS CORPORATION, Tokyo (JP)

(72) Inventors: Ryusuke Yamada, Hiratsuka (JP); Takahiro Takano, Hiratsuka (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 75 days.

(21) Appl. No.: 16/084,663

(22) PCT Filed: Mar. 6, 2017

(86) PCT No.: PCT/JP2017/008669
§ 371 (c)(1),
(2) Date: Sep. 13, 2018

(87) PCT Pub. No.: WO2017/159418
PCT Pub. Date: Sep. 21, 2017

(65) Prior Publication Data
US 2019/0077957 A1 Mar. 14, 2019

(30) Foreign Application Priority Data

Mar. 16, 2016 (JP) .............................. JP2016-052306
Mar. 16, 2016 (JP) .............................. JP2016-052307
Jan. 10, 2017 (JP) .............................. JP2017-001742

(51) Int. Cl.
*C08L 77/06* (2006.01)
*C08L 23/02* (2006.01)
*C08K 7/14* (2006.01)
*C08K 3/26* (2006.01)
*C08L 91/06* (2006.01)
*C08K 5/01* (2006.01)
*C08K 3/04* (2006.01)

(52) U.S. Cl.
CPC .............. *C08L 77/06* (2013.01); *C08K 3/26* (2013.01); *C08K 5/01* (2013.01); *C08K 7/14* (2013.01); *C08L 23/02* (2013.01); *C08L 91/06* (2013.01); *C08K 3/04* (2013.01); *C08K 2003/265* (2013.01); *C08K 2201/005* (2013.01); *C08L 2205/24* (2013.01)

(58) Field of Classification Search
CPC .......... C08L 77/06; C08L 23/02; C08L 91/06; C08K 77/06; C08K 5/01; C08K 7/14; C08K 3/26
See application file for complete search history.

(56) References Cited

U.S. PATENT DOCUMENTS

| 5,147,944 | A | | 9/1992 | Takeda | |
| 5,804,638 | A | * | 9/1998 | Hayashi | C08K 3/04 |
| | | | | | 524/495 |
| 2003/0166756 | A1 | * | 9/2003 | Hasegawa | C08K 3/26 |
| | | | | | 524/425 |
| 2008/0146718 | A1 | * | 6/2008 | Gijsman | C08K 3/08 |
| | | | | | 524/439 |
| 2010/0063191 | A1 | * | 3/2010 | Hirono | C08L 77/00 |
| | | | | | 524/284 |
| 2012/0177937 | A1 | * | 7/2012 | Ogawa | C08G 69/26 |
| | | | | | 428/458 |
| 2012/0214904 | A1 | * | 8/2012 | Prusty | C08K 3/08 |
| | | | | | 523/216 |
| 2015/0166726 | A1 | | 6/2015 | Ogawa et al. | |
| 2015/0329670 | A1 | | 11/2015 | Washio et al. | |

FOREIGN PATENT DOCUMENTS

| CN | 101600783 | A | | 12/2009 | |
| CN | 102449028 | A | | 5/2012 | |
| CN | 104797631 | A | | 5/2012 | |
| CN | 102575099 | A | | 7/2012 | |
| CN | 103804901 | | * | 5/2014 | ............. C08L 77/06 |
| CN | 104788949 | | * | 7/2015 | ............. C08L 77/02 |
| JP | 04-227959 | A | | 8/1992 | |
| JP | 6-73287 | A | | 3/1994 | |
| JP | H07-228774 | A | | 8/1995 | |
| JP | 09-177765 | A | | 7/1997 | |
| JP | 2003-105196 | A | | 4/2003 | |
| JP | 2003-335939 | A | | 11/2003 | |
| JP | 2003-335942 | A | | 11/2003 | |
| JP | 2004-83640 | A | | 3/2004 | |
| JP | 2008-133465 | A | | 6/2008 | |
| JP | 2009-269952 | A | | 11/2009 | |
| JP | 2011-57977 | A | | 3/2011 | |

(Continued)

OTHER PUBLICATIONS

Machine translation of CN 103804901 (Year: 2014).*
English machine translation of CN 104788949. Jul. 22, 2015 (Year: 2015).*
International Preliminary Report on Patentability and English Translation of Written Opinion of the International Searching Authority, dated Sep. 18, 2018, issued in PCT/JP2017/008669 (Forms PCT/IB/373 and PCT/IB/237).
Chinese Office Action and Search Report dated Apr. 13, 2020, for corresponding Chinese Patent Application No. 201780017546.X, with partial English translation.
Japanese Office Action dated Jul. 21, 2020 for corresponding Application No. 2017-001743 with an English translation. Chinese Office Action and Search Report, dated Aug. 24, 2020, for corresponding Chinese Application No. 201780017546.X, with an English translation of the Chinese Office Action.

(Continued)

*Primary Examiner* — John E Uselding
(74) *Attorney, Agent, or Firm* — Birch, Stewart, Kolasch & Birch, LLP.

(57) ABSTRACT

Provided is a polyamide resin composition capable of yielding highly abrasion-resistant molded article, while keeping high mechanical strength, and, a molded article using the polyamide resin composition. The polyamide resin composition contains (A) polyamide resin, (B) polyolefin wax, and (C) at least one metal salt selected from alkali metal salt and alkali earth metal salt, and the (A) polyamide resin contains (a-1) semiaromatic polyamide resin.

16 Claims, No Drawings

(56) References Cited

FOREIGN PATENT DOCUMENTS

| | | |
|---|---|---|
| JP | 2011-88944 A | 5/2011 |
| JP | 2012-41527 A | 3/2012 |
| JP | 2012-131918 A | 7/2012 |
| JP | 2013-508523 A | 3/2013 |
| JP | 2013-64420 A | 4/2013 |
| JP | 2013-199570 A | 10/2013 |
| WO | WO 2010/137703 A1 | 2/2010 |
| WO | WO 2011/030910 A1 | 3/2011 |

OTHER PUBLICATIONS

Japanese Office Action dated Oct. 6, 2020 for corresponding Japanese Patent Application No. 2017-001743, with an English translation.

Japanese Notification of Written Submission of Publications for Application No. 2017-001742, dated Dec. 1, 2020, with English language translation.

Japanese Office Action for Application No. 2017-001742, dated Jan. 26, 2021, with English language translation.

* cited by examiner

POLYAMIDE RESIN COMPOSITION AND MOLDED ARTICLE

TECHNICAL FIELD

This invention relates to a polyamide resin composition, and a molded article using the polyamide resin composition.

BACKGROUND ART

Usage of polyamide resin for sliding part has been discussed. For example, Patent Literature 1 discloses a sliding component (sliding part) composed of a polyamide resin composition that contains 100 parts by mass of polyamide composed of terephthalic acid component and 1,10-decanediamine component, and 0.5 to 60 parts by mass of a sliding modifier. Patent Literature 2 discloses a resin composition for abrasion resistant molded article, which contains a resin-impregnated fiber bundle that is obtained by bundling fibrous fillers while aligning their longitudinal direction, by allowing a molten polyamide resin to impregnate into the fibrous filler bundle to integrate them, and then by cutting the bundle into 5 to 15 mm long; wherein the polyamide is an aromatic polyamide obtained from an aromatic dicarboxylic acid and an aliphatic diamine, or from an aliphatic dicarboxylic acid and an aromatic diamine; the fibrous filler is selected from carbon fiber, glass fiber, aramid fiber and basalt fiber; and the resin composition, when tested in an abrasion test, is visually confirmed to cause no turning-up of the skin portion.

CITATION LIST

Patent Literature

[Patent Literature 1] JP-A-2013-64420
[Patent Literature 2] JP-A-2012-131918

SUMMARY OF THE INVENTION

Technical Problem

As described above, the sliding part using the polyamide resin is required to excel in abrasion resistance. The present inventors, however, found from our investigations that such polyamide resin occasionally showed insufficient abrasion resistance, or showed poor mechanical strength despite excellent abrasion resistance. This invention is aimed to solve the problem, and is to provide a polyamide resin composition capable of yielding highly abrasion-resistant molded article, while keeping high mechanical strength, and, a molded article using the polyamide resin composition.

Considering the aforementioned problem, the present inventors found after investigations that the problem may be solved by means <1> below, and more preferably by means <2> to <16>.

<1> A polyamide resin composition comprising: (A) polyamide resin, (B) polyolefin wax, and (C) at least one metal salt selected from alkali metal salt and alkali earth metal salt, and the (A) polyamide resin containing (a-1) semiaromatic polyamide resin.

<2> The polyamide resin composition of <1>, wherein the (a-1) semiaromatic polyamide resin contains a polyamide resin that comprises a structural unit derived from diamine and a structural unit derived from dicarboxylic acid, 70 mol % or more of the structural unit derived from diamine being derived from at least either meta-xylylenediamine or para-xylylenediamine, and 70 mol % or more the structural unit derived from dicarboxylic acid being derived from a straight chain aliphatic α, ω-dicarboxylic acid having 4 to 20 carbon atoms.

<3> The polyamide resin composition of <1> or <2>, wherein the (C) metal salt has a particle form with an aspect ratio of smaller than 5.

<4> The polyamide resin composition of any one of <1> to <3>, wherein the (C) metal salt is a carbonate.

<5> The polyamide resin composition of any one of <1> to <4>, wherein the (C) metal salt is an alkali earth metal salt.

<6> The polyamide resin composition of any one of <1> to <5>, wherein content of the (B) polyolefin wax is 1 to 50 parts by mass, per 100 parts by mass of the (A) polyamide resin.

<7> A polyamide resin composition comprising: (A) polyamide resin, (B) polyolefin wax, and (C) at least one metal salt selected from alkali metal salt and alkali earth metal salt, the (A) polyamide resin containing a polyamide resin that comprises a structural unit derived from diamine and a structural unit derived from dicarboxylic acid, 70 mol % or more of the structural unit derived from diamine being derived from at least either meta-xylylenediamine or para-xylylenediamine, and 70 mol % or more the structural unit derived from dicarboxylic acid being derived from a straight chain aliphatic α, ω-dicarboxylic acid having 4 to 20 carbon atoms, the (C) metal salt having a particle form with an aspect ratio of smaller than 5, and being calcium carbonate, and content of the (B) polyolefin wax being 1 to 50 parts by mass, per 100 parts by mass of the (A) polyamide resin.

<8> The polyamide resin composition of any one of <1> to <7>, further comprising: (a-2) polyamide resin having a melting point higher than a melting point of the (a-1) semiaromatic polyamide resin.

<9> The polyamide resin composition of <8>, wherein the (a-2) polyamide resin having a melting point higher than a melting point of the (a-1) semiaromatic polyamide resin, is polyamide 66.

<10> The polyamide resin composition of any one of <1> to <9>, further comprising: 10 to 200 parts by mass of an inorganic filler, per 100 parts by mass of the (A) polyamide resin.

<11> The polyamide resin composition of <10>, wherein the inorganic filler is glass fiber.

<12> The polyamide resin composition of any one of <1> to <11>, further comprising: 0.1 to 10 parts by mass of a nucleating agent, per 100 parts by mass of the (A) polyamide resin.

<13> The polyamide resin composition of any one of <1> to <12>, further comprising: 0.1 to 10 parts by mass of a black colorant, per 100 parts by mass of the (A) polyamide resin.

<14> The polyamide resin composition of any one of <1> to <13>, wherein the (A) polyamide resin further comprises (a-3) aliphatic polyamide resin having a melting point lower than a melting point of the (a-1) semiaromatic polyamide, and having a glass transition temperature 20° C. or more lower than a glass transition temperature of the (a-1) semiaromatic polyamide.

<15> A molded article formed by using the polyamide resin composition described in any one of <1> to <14>.

<16> The molded article of <15>, being a sliding part.

Advantageous Effects of Invention

According to this invention, it now became possible to provide a polyamide resin composition capable of yielding highly abrasion-resistant molded article, while retaining high mechanical strength, and, a molded article using the polyamide resin composition.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

The polyamide resin composition of this invention includes (A) polyamide resin, (B) polyolefin wax, and (C) at least one metal salt selected from alkali metal salt and alkali earth metal salt, wherein the (A) polyamide resin contains (a-1) semiaromatic polyamide resin. With such design, obtainable is a molded article that excels in abrasion resistance, while keeping high mechanical strength. A presumed mechanism is that the (a-1) semiaromatic polyamide resin contributes to keep a high level of mechanical strength, the (C) metal salt effectively suppresses the polyolefin wax from leaching, and the sliding part is kept soft and less likely to be shaved.

<(A) Polyamide Resin>
<<(a-1) Semiaromatic Polyamide Resin>>

The (A) polyamide resin in this invention contains the (a-1) semiaromatic polyamide resin. With the semiaromatic polyamide resin contained therein, an obtainable molded article will successfully have high levels of mechanical strength and deflection temperature under load.

The semiaromatic polyamide resin in this context means that it is composed of the structural unit derived from diamine and the structural unit derived from dicarboxylic acid, in which aromatic ring-containing structural units account for 30 to 70 mol % of the total content of the structural unit derived from diamine and the structural unit derived from dicarboxylic acid, and aromatic ring-containing structural units account for 40 to 60 mol % of the total content of the structural unit derived from diamine and the structural unit derived from dicarboxylic acid.

The semiaromatic polyamide resin used in this invention is exemplified by polyhexamethylene terephthalamide (polyamide 6T), polyhexamethylene isophthalamide (polyamide 6I), polyamide 66/6T, polyxylylene adipamide, polyxylylene sebacamide, polyxylylene dodecamide, polyamide 9T, polyamide 9MT, and polyamide 6I/6T.

Among the polyamide resin described above, preferable is a polyamide resin that is composed of the structural unit derived from diamine and the structural unit derived from dicarboxylic acid, in which 70 mol % or more of the structural unit derived from diamine is derived from at least either meta-xylylenediamine or para-xylylenediamine, and 70 mol % or more of the structural unit derived from dicarboxylic acid is derived from a straight chain aliphatic α, ω-dicarboxylic acid having 4 to 20 carbon atoms (occasionally referred to as "XD-based polyamide", hereinafter), from the viewpoints of moldability and heat resistance.

In the XD-based polyamide, 70 mol % or more, preferably 80 mol % or more, more preferably 90 mol % or more, and yet more preferably 95 mol % or more of the structural unit derived from diamine is derived from at least either meta-xylylenediamine or para-xylylenediamine; and 70 mol % or more, preferably 80 mol % or more, even more preferably 90 mol % or more, and yet more preferably 95 mol % or more of the structural unit derived from dicarboxylic acid is derived from a straight chain aliphatic α, ω-dicarboxylic acid having 4 to 20 carbon atoms. In the XD-based polyamide, preferably 50 mol % or more, and more preferably 60 mol % or more of the structural unit derived from diamine is derived from meta-xylylenestructural unit derived from diamine.

Diamines other than meta-xylylenediamine and para-xylylenediamine, usable as starting material diamine components of the XD-based polyamide, are exemplified by aliphatic diamines such as tetramethylenediamine, pentamethylenediamine, 2-methylpentanediamine, hexamethylenediamine, heptamethylenediamine,octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl) methane, 2,2-bis(4-aminocyclohexyl)propane, bis(aminomethyl)decalin, and bis(aminomethyl)tricyclodecane; and aromatic ring-containing diamines such as bis (4-aminophenyl) ether, paraphenylenediamine, and bis(aminomethyl) naphthalene. Only one of them may be used, or two or more of them may be used in a mixed manner.

When diamines other than xylylene diamine are used as the diamine component, they preferably accounts for less than 20 mol % of the structural unit derived from diamine, which is more preferably 10 mol % or less.

The straight chain aliphatic α, ω-dicarboxylic acid having 4 to 20 carbon atoms, suitably used as the starting dicarboxylic acid component of the polyamide resin, is exemplified by aliphatic dicarboxylic acids such as succinic acid, glutaric acid, pimelic acid, suberic acid, azelaic acid, adipic acid, sebacic acid, undecanedioic acid, and dodecanedioic acid. One of them may be used, or two or more of them may be used in a mixed manner. Among them, adipic acid or sebacic acid is preferable, since the polyamide resin will have the melting point within a suitable range for molding process. Adipic acid is more preferable.

The dicarboxylic acid components, other than the straight chain aliphatic α, ω-dicarboxylic acid having 4 to 20 carbon atoms, are exemplified by phthalic acid compounds such as isophthalic acid, terephthalic acid and orthophthalic acid; and naphthalenedicarboxylic acid isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Only one of them may be used, or two or more of them may be used in a mixed manner. When the dicarboxylic acid component, other than the straight chain aliphatic α, ω-dicarboxylic acid having 4 to 20 carbon atoms, are used, the content of them is preferably less than 20 mol % of the structural unit derived from dicarboxylic acid, which is more preferably 10 mol % or less.

The polyamide resin that contains the structural unit derived from diamine and the structural unit derived from dicarboxylic acid as major ingredients does not completely exclude any other structural units, and may of course contain structural units derived from lactams such as ε-caprolactam and laurolactam; or from aliphatic aminocarboxylic acids such as aminocaproic acid and aminoundecanoic acid. The major ingredients in this context mean the ingredients that give the largest total content of the structural unit derived from diamine and the structural unit derived from dicarboxylic acid in the (a-1) semiaromatic polyamide resin, among all structural units. In this invention, the total content of the structural unit derived from diamine and the structural unit derived from dicarboxylic acid in the (a-1) semiaromatic polyamide resin preferably accounts for 90% or more of the total structural units, and more preferably accounts for 95% or more.

The (a-1) semiaromatic polyamide resin preferably has a melting point of 150 to 310° C., which is more preferably 180 to 300° C., and even more preferably 180 to 250° C.

The (a-1) semiaromatic polyamide resin preferably has a glass transition temperature of 50 to 100° C., which is more preferably 55 to 100° C., and particularly 60 to 100° C. Within these ranges, the molded article will tend to have further improved heat resistance.

The (a-1) semiaromatic polyamide resin preferably has a number average molecular weight (Mn) of 6,000 or above at the lowest, which is more preferably 8,000 or above, even more preferably 10,000 or above, yet more preferably 15,000 or above, furthermore preferably 20,000 or above, and still more preferably 22,000 or above. The Mn is preferably 35,000 or below at the highest, which is more preferably 30,000 or below, even more preferably 28,000 or below, and yet more preferably 26,000 or below. Within these ranges, the heat resistance, elastic modulus, dimensional stability and moldability will further be improved.

The (a-1) semiaromatic polyamide resin preferably has a polydispersity (weight average molecular weight/number average molecular weight (Mw/Mn)) of 1.8 to 3.1. The polydispersity is more preferably 1.9 to 3.0, and even more preferably 2.0 to 2.9. With the polydispersity controlled within these ranges, it may become more easier to obtain a three-dimensional structure that excels in mechanical properties.

The polydispersity of the polyamide resin is controllable by making a suitable choice, for example, on types and amounts of initiator or catalyst used for polymerization, and polymerization conditions including reaction temperature, pressure and time. Alternatively, it is also controllable by mixing two or more types of polyamide resins with different average molecular weights obtained under different polymerization conditions, or by subjecting the (a-1) semiaromatic polyamide resin after polymerization to fractional precipitation.

The number average molecular weight and the weight average molecular weight may be determined by GPC measurement, and may more specifically be measured by employing a measuring instrument "HLC-8320GPC" from Tosoh Corporation, two "TSKgel Super HM-H" columns from Tosoh Corporation, a 10 mmol/L sodium trifluoroacetate solution in hexafluoroisopropanol (HFIP) as an eluent, a resin concentration of 0.02% by mass, a column temperature of 40° C., a flow rate of 0.3 mL/min, and a refractive index (RI) detector, and may be determined referring to standard polymethyl methacrylate (PMMA) equivalent values. The analytical curve may be prepared by using PMMA dissolved in HFIP, with the concentration varied over 6 levels.

The content of the (a-1) semiaromatic polyamide resin in the polyamide resin composition of this invention is preferably 10% by mass or above, at the lowest, of the (A) polyamide resin, which is more preferably 30% by mass or above, even more preferably 50% by mass or above, yet more preferably 70% by mass or above, furthermore preferably 75% by mass or above, and even may be 80% by mass or above. The upper limit of the content is 100% by mass or below, and preferably 95% by mass or below.

The (A) polyamide resin in this invention may contain only one type of the (a-1) semiaromatic polyamide resin, or may contain two or more types. When two or more types are contained, the total content preferably falls within the above described ranges.

<<(a-2) Polyamide Resin>>

The (A) polyamide resin in this invention may contain a polyamide resin (may occasionally be referred to as "(a-2) polyamide resin", hereinafter) with melting point higher than that of the (a-1) semiaromatic polyamide resin. With such polyamide resin mixed therein, the resin composition will tend to have an elevated heat deformation temperature. The (a-2) polyamide resin has a melting point higher than that of the (a-1) semiaromatic polyamide resin, wherein it is preferably 10° C. or more higher, and more preferably 20° C. or more higher. Difference of melting points between the (a-2) polyamide resin and the (a-1) semiaromatic polyamide resin is preferably 60° C. or smaller, and more preferably 35° C. or smaller.

When the polyamide resin composition of this invention contains two or more types of the (a-1) semiaromatic polyamide resins, or, two or more types of the (a-2) polyamide resins, it suffices that at least one type of the (a-1) semiaromatic polyamide resin and at least one type of (a-2) polyamide resin satisfy the aforementioned relation. It is however preferable that, preferably 90% by mass or more, more preferably 95% by mass or more, and even more preferably 98% by mass or more of the (a-1) semiaromatic polyamide resin; and preferably 90% by mass or more, more preferably 95% by mass or more, and even more preferably 98% by mass or more of the (a-2) polyamide resin satisfy the aforementioned relations.

Difference of glass transition temperatures between the (a-2) polyamide resin and the (a-1) semiaromatic polyamide resin is preferably 60° C. or smaller, and more preferably 35° C. or smaller.

The (a-2) polyamide resin preferably has a melting point of 180 to 300° C., which is more preferably 190 to 290° C., and even more preferably 200 to 280° C.

The (a-2) polyamide resin preferably has a glass transition temperature of 30 to 120° C., which is more preferably 35 to 100° C., and particularly 40 to 80° C.

The (a-2) polyamide resin preferably has a number average molecular weight (Mn) of 6,000 or above at the lowest, which is more preferably 8,000 or above, even more preferably 10,000 or above, yet more preferably 15,000 or above, furthermore preferably 20,000 or above, and still more preferably 22,000 or above. The Mn is preferably 35,000 or below at the highest, which is more preferably 30,000 or below, yet more preferably 28,000 or below, and furthermore preferably 26,000 or below.

The (a-2) polyamide resin is preferably polyamide 46, polyamide 66, polyamide 610, polyamide 612, polyamide 11 or polyamide 12, and is more preferably polyamide 66. Also polyamide 6 may be used depending on types of the (a-1) semiaromatic polyamide resin.

Polyamide 66 is exemplified by UBE Nylon 2015B, 2020B, 2026B (trade names) from Ube Industries, Ltd.; Amilan CM3007, CM3001, CM3001-N, CM3006, CM3301, CM3304, CM3004 (trade names) from Toray Industries, Inc.; Leona 1200S, 1300S, 1500, 1700 (trade names) from Asahi Kasei Corporation; Ultramid 1000, 1003, A3, N322, A3X2G5 (trade names) from BASF GmbH; GRILON AS Series, AZ Series, AR, AT Series (trade names) from EMS AG; and Zytel 101, 103, 42A, 408 (trade names) from DuPont.

The content of the (a-2) polyamide resin in the polyamide resin composition of this invention, when mixed therein, is preferably 1% by mass or above at the lowest in the (A)

polyamide resin, which is more preferably 3% by mass or above, even more preferably 5% by mass or above, yet more preferably 8% by mass or above, and furthermore preferably 10% by mass or above. The upper limit of the content is preferably 50% by mass or below, more preferably 40% by mass or below, yet more preferably 30% by mass or below, and furthermore preferably 20% by mass or below. The (a-1) semiaromatic polyamide resin and the (a-2) polyamide resin will never exceed 100% by mass in total. When the (a-3) low melting point aliphatic polyamide resin is added, the (a-1) semiaromatic polyamide resin and the (a-2) polyamide resin and the (a-3) low melting point aliphatic polyamide resin will never exceed 100% by mass in total.

The (A) polyamide resin in this invention may contain only one type of the (a-2) polyamide resin, or two or more types thereof. When two or more types are contained, the total content preferably falls within the above described ranges.

<<(a-3) Low Melting Point Aliphatic Polyamide Resin>>

The (A) polyamide resin in this invention contains an aliphatic polyamide resin (may occasionally be referred to as "(a-3) low melting point aliphatic polyamide resin", hereinafter) with melting point lower than that of the (a-1) semiaromatic polyamide, and with glass transition temperature 20° C. or more lower than that of the same. Since the (a-3) low melting point aliphatic polyamide resin has a low glass transition temperature and a low melting point, so that when used for a sliding part and when the sliding surface thereof is heated, the surface will be softened, and thereby the surface of the sliding part will effectively be prevented from being worn.

The (a-3) low melting point aliphatic polyamide resin has a melting point lower than that of the (a-1) semiaromatic polyamide resin, wherein it is preferably 10° C. or more lower, and more preferably 15° C. or more lower. Difference of melting points between the (a-3) low melting point aliphatic polyamide resin and the (a-1) semiaromatic polyamide resin preferably falls within 30° C.

The (a-3) low melting point aliphatic polyamide resin has a glass transition temperature 20° C. or more lower than that of the (a-1) semiaromatic polyamide resin, which is more preferably 25° C. or more lower, and more preferably 26° C. or more lower. Difference of glass transition temperatures between the (a-3) low melting point aliphatic polyamide resin and the (a-1) semiaromatic polyamide resin preferably falls within 35° C.

When the polyamide resin composition of this invention contains two or more types of the (a-1) semiaromatic polyamide resins, or, two or more types of the (a-3) low melting point aliphatic polyamide resins, it suffices that at least one type of the (a-1) semiaromatic polyamide resin and at least one type of the (a-3) low melting point aliphatic polyamide resin satisfy the aforementioned relations. It is however preferable that 90% by mass or more, more preferably 95% by mass or more, and even more preferably 98% by mass or more of the (a-1) semiaromatic polyamide resin satisfies the aforementioned relations; and preferably 90% by mass or more, more preferably 95% by mass or more, and even more preferably 98% by mass or more of the (a-3) low melting point aliphatic polyamide resin satisfies the aforementioned relations.

The (a-3) low melting point aliphatic polyamide resin preferably has a melting point of 180 to 300° C., which is more preferably 190 to 290° C., and even more preferably 200 to 280° C.

The (a-3) low melting point aliphatic polyamide resin preferably has a glass transition temperature of 30 to 120° C., which is more preferably 35 to 100° C., and particularly 40 to 80° C.

The (a-3) low melting point aliphatic polyamide resin preferably has a number average molecular weight (Mn) of 4,000 or above at the lowest, which is more preferably 4,000 or above, even-more preferably 5,000 or above, yet more preferably 7,000 or above, furthermore preferably 8,000 or above, and still more preferably 10,000 or above. The Mn is preferably 20,000 or below at the highest, more preferably 17,000 or below, even more preferably 15,000 or below, and yet more preferably 13,000 or below.

The aliphatic polyamide resin in this context means that 60% or more of the structural unit that composes the polyamide resin is structural unit derived from aliphatic compound, more preferably means that 60% or more of the structural unit is structural unit derived from aliphatic compound, even more preferably means that 80% or more of the structural unit is structural unit derived from aliphatic compound, yet more preferably means that 90% or more of the structural unit is structural unit derived from aliphatic compound, and furthermore preferably means that 95% or more of the structural unit is structural unit derived from aliphatic compound.

The (a-3) low melting point aliphatic polyamide resin is suitably selected in relation to the (a-1) semiaromatic polyamide resin, and is preferably polyamide 6, polyamide 46, polyamide 66, polyamide 610, polyamide 612, polyamide 11 or polyamide 12, and is more preferably polyamide 6.

Polyamide 6 is exemplified by Zytel 1011FB (trade name) from DuPont; UBE Nylon 1011B, 1015B, 1022B, 1018SE (trade names) from Ube Industries, Ltd.; Amilan CM1007, CM1017, CM1021, CM1026, CM1014 (trade names) from Toray Industries, Inc.; Ultramid 8200, 8202, 8270, B27, B3K, B3S, 8232G (trade names) from BASF GmbH; and GRILON BS Series, BZ Series, BRZ Series (trade names) from EMS AG.

The lower limit of the content of the (a-3) low melting point aliphatic polyamide resin in the polyamide resin composition of this invention is preferably 10% by mass or above in the (A) polyamide resin, and more preferably 15% by mass or above. The upper limit of the content is preferably 70% by mass or below, even more preferably 60% by mass or below, and may even be 50% by mass or below.

The (A) polyamide resin in this invention may contain only one type of the (a-3) low melting point aliphatic polyamide resin, or two more types thereof. When two or more types are contained, the total content preferably falls within the above described ranges.

<<Polyamide Resin Blend>>

The (A) polyamide resin in this invention may contain one type, or two or more types of polyamide resins other than the aforementioned polyamide resins (a-1) to (a-3).

In one embodiment of this invention, the total content of the (a-1) semiaromatic polyamide resin and the (a-2) polyamide resin preferably accounts for 90% by mass or more of the (A) polyamide resin, more preferably accounts for 95% by mass or more, and even more preferably accounts for 99% by mass or more.

In this embodiment, ratio by mass of the (a-1) semiaromatic polyamide resin and the (a-2) polyamide resin, namely (a-1)/(a-2), is preferably 1.0 to 10.0, and more preferably 3.0 to 8.0. Within these ratios, it now becomes possible to further elevate the heat deformation temperature of the resin composition, without largely damaging the low water absorption characteristic of the semiaromatic polyamide resin.

Other embodiment of this invention relates to a mode of mixing the (a-3) low melting point aliphatic polyamide resin. In this embodiment, the total content of the (a-1) semiaromatic polyamide resin and the (a-2) polyamide resin and the (a-3) low melting point aliphatic polyamide resin preferably accounts for 90% by mass or more of the (A) polyamide resin, more preferably accounts for 95% by mass or more, and even more preferably accounts for 99% by mass or more.

In this embodiment, ratio by mass of the (a-1) semiaromatic polyamide resin and the (a-3) low melting point aliphatic polyamide resin, namely (a-1)/(a-3), is preferably 0.5 to 5.0. Within the ratio, specific wear amount will tend to be further reduced.

The total content of the (A) polyamide resin in the polyamide resin composition of this invention is preferably 10% by mass or above at the lowest, which is more preferably 20% by mass or above, even more preferably 25% by mass or above, and yet more preferably 30% by mass or above. The total content is preferably 90% by mass or below at the highest, which is more preferably 80% by mass or below, even more preferably 60% by mass or below, yet more preferably 50% by mass or below, furthermore preferably 45% by mass or below, and still more preferably 40% by mass or below.

<(B) Polyolefin Wax>

The polyamide resin composition of this invention contains a polyolefin wax. With the polyolefin wax contained therein, the resin composition will successfully have reduced coefficient of friction, and will make the sliding surface of material less likely to be worn. Examples of the polyolefin wax include low molecular weight polyethylene, low molecular weight polyethylene copolymer, and modified polyethylene wax having a polar group introduced therein by modifying them through oxidation or through using acid. By mixing, relative to the (B) polyolefin wax, 1 to 10% by mass of the modified polyethylene wax having introduced therein a polar group through oxidation modification or acid modification, the polyolefin wax will be dispersed in an improved manner in the polyamide resin, which is more preferable. The number average molecular weight (Mn) of the polyolefin wax is a matter of proper choice, wherein it is preferably smaller than 20000, more preferably 500 to 15000, even more preferably 1000 to 10000, and particularly 1000 to 9000. The Mn of the polyolefin wax may be measured by gel permeation chromatography (GPC).

The polyolefin wax used in this invention preferably has a melting point of 60 to 145° C.

The polyolefin wax is exemplified by polyethylene wax, polypropylene wax, oxidized polyethylene wax, acid-modified polyethylene wax, and acid-modified polypropylene wax.

Commercially available polyolefin wax employable here include a series of "Mitsui Hi-WAX" such as 800P, 400P, 200P, 100P, 720P, 420P, 320P, 405MP, 320MP, 4051E, 2203A, 1140H, NL800, NP055, NP105, NP505, NP805, 1105A, 2203A and NP0555A, from Mitsui Chemicals Inc.

The content of the polyolefin wax in the polyamide resin composition of this invention is preferably 1 part by mass or above at the lowest, per 100 parts by mass of the (A) polyamide resin, which is more preferably 3 parts by mass or above, even more preferably 4 parts by mass or above, yet more preferably 5 parts by mass or above, furthermore preferably 7 parts by mass or above, and still more preferably 9 parts by mass or above. The upper limit of the content is preferably 50 parts by mass or below, more preferably 30 parts by mass or below, even more preferably 25 parts by mass or below, yet more preferably 20 parts by mass or below, and furthermore preferably 15 parts by mass or below.

The polyamide resin composition of this invention may contain only one type of polyolefin wax, or may contain two or more types thereof. When two or more types are contained, the total content preferably falls within the above described ranges.

<(C) Metal Salt>

The polyamide resin composition of this invention contains at least one metal salt selected from alkali metal salt and alkali earth metal salt. By mixing the (C) metal salt, it now becomes possible to effectively suppress the polyolefin wax from leaching, to keep a higher level of hardness of the sliding surface when given in the form of sliding part, and to improve the abrasion resistance. The metal salt used in this invention is preferably alkali earth metal salt.

The alkali metal is exemplified by sodium and potassium. The alkali earth metal is exemplified by calcium, magnesium and barium, wherein calcium or barium is preferable.

In this invention, the metal salt is preferably carbonates such as calcium carbonate, magnesium carbonate and barium carbonate; and sulfates such as calcium sulfate and magnesium sulfate. Carbonates are more preferable, calcium carbonate and barium carbonate are more preferable, and calcium carbonate is even more preferable.

The metal salt preferably has a particle size of 0.1 to 50 μm, which is more preferably 0.5 to 30 μm, and even more preferably 1 to 10 μm.

The metal salt used in this invention is preferably in the form of particle with an aspect ratio of smaller than 5. Within this level of aspect ratio, the metal salt will have a shape closer to sphere, and thereby the effect of this invention will more effectively be demonstrated.

The metal salt is commercially available, for example, as NS100 from Nitto Funka Kogyo K. K.

The content of the metal salt in the polyamide resin composition of this invention is preferably 1 part by mass or above at the lowest, per 100 parts by mass of the (A) polyamide resin, which is more preferably 3 parts by mass or above, even more preferably 4 parts by mass or above, yet more preferably 5 parts by mass or above, furthermore preferably 6 parts by mass or above, and still more preferably 9 parts by mass or above. The upper limit of the content is preferably 100 parts by mass or below, more preferably 50 parts by mass or below, even more preferably 30 parts by mass or below, yet more preferably 25 parts by mass or below, furthermore preferably 20 parts by mass or below, and still more preferably 15 parts by mass or below.

The polyamide resin composition of this invention may contain only one type of the (C) metal salt, or two or more types thereof. When two or more types are contained, the total content preferably falls within the above described ranges.

<Inorganic Filler>

To the polyamide resin composition of this invention, it is preferable to add an inorganic filler, for the purpose of reinforcing the polyamide resin composition, and to improve the rigidity, heat resistance, and dimensional stability. Form of the inorganic filler may be any of those of fiber, plate, particle and needle without special limitation, wherein the fiber form is preferable. The inorganic filler in this invention, however, conceptually exclude nucleating agent and metal salt described later.

Specific examples of the inorganic filler include those mainly composed of glass (glass fiber, glass flake, glass bead, milled fiber), alumina fiber and carbon fiber. The inorganic filler mainly composed of glass is more preferable, and glass fiber is even more preferable.

The glass fiber suitably used in this invention preferably has a number average fiber diameter of 20 μm or smaller. The fiber of 1 to 15 μm in diameter is preferable, from the viewpoints of better balance among physical properties (heat resistant rigidity, impact strength), and further reduction in warping after molding.

Composition of the starting glass may also be alkali-free, and such glass is exemplified by E-glass, C-glass and S-glass. E-glass is suitably used in this invention.

The glass fiber preferably has a surface treated with a surface modifier such as silane coupling agent, which is exemplified by γ-methacryloxypropyl trimethoxysilane, γ-glycidoxypropyl trimethoxysilane, and γ-aminopropyl tri-ethoxysilane. The amount of adhesion of the surface modifier is preferably 0.01 to 1% by mass of the glass fiber. Also employable are glass fibers having the surfaces treated, depending on needs, with lubricant such as aliphatic amide and silicone oil; antistatic agent such as quaternary ammonium salt; film formable resin such as epoxy resin and urethane resin; and mixture of film-formable resin with heat stabilizer or flame retardant.

When the polyamide resin composition of this invention contains the inorganic filler, the content thereof is preferably 10 parts by mass or above at the lowest, per 100 parts by mass of the (A) polyamide resin, which is more preferably 50 parts by mass or above, even more preferably 75 parts by mass or above, yet more preferably 100 parts by mass or above, furthermore preferably 130 parts by mass or above, and still more preferably 150 parts by mass or above. The upper limit of the content is preferably 200 parts by mass or below, more preferably 190 parts by mass or below, and even more preferably 185 parts by mass or below.

The polyamide resin composition of this invention may contain only one type of the inorganic filler, or two or more types thereof. When two or more types are contained, the total content preferably falls within the above described ranges.

<Nucleating Agent>

The polyamide resin composition of this invention may contain a nucleating agent, for the purpose of accelerating crystallization and for improving the moldability. Types of the nucleating agent is not specifically limited. Suitably employed are talc, boron nitride, mica, kaolin, calcium carbonate, barium sulfate, silicon nitride, potassium titanate and molybdenum disulfide. Talc and boron nitride are more preferable, and talc is even more preferable.

The nucleating agent preferably has an average particle size of 4 to 10 μm.

When the polyamide resin composition of this invention contains the nucleating agent, the content thereof is preferably 0.1 to 10 parts by mass per 100 parts by mass of the (A) polyamide resin, which is more preferably 0.5 to 8 parts by mass, and even more preferably 1 to 5 parts by mass.

The polyamide resin composition of this invention may contain only one type of the nucleating agent, or may contain two or more types thereof. When two or more types are contained, the total content preferably falls within the above described ranges.

<Black Colorant>

The polyamide resin composition of this invention may contain a black colorant. The black colorant used in this invention is exemplified by carbon black. As for details of carbon black, paragraph [0021] of JP-A-2011-57977 may be referred to, the content of which is incorporated by reference into the present specification.

When the black colorant such as carbon black is added to the polyamide resin composition of this invention, in the process of manufacturing the polyamide resin composition, descriptions of paragraphs [0038] to [0042] of JP-A-2011-57977 may be referred to, the contents of which are incorporated by reference into the present specification.

The carbon black used in this invention preferably has a DBP oil absorption of 40 to 60 g/cm$^3$.

When the polyamide resin composition of this invention contains the black colorant, the content thereof is preferably 0.1 parts by mass or above at the lowest, per 100 parts by mass of the (A) polyamide resin, which is more preferably 0.5 parts by mass or above, even more preferably 0.6 parts by mass or above, yet more preferably 0.8 parts by mass, and furthermore preferably 1 part by mass or above. With the lower limit value controlled to the above described values, the specific wear amount may further be reduced. Also appearance of the molded article may be improved. Meanwhile, the content of the black colorant is preferably 10 parts by mass or below at the highest, per 100 parts by mass of the (A) polyamide resin, which is more preferably 8 parts by mass or below, and even more preferably 6 parts by mass or below. With the upper limit value controlled to the above described values, appearance of the molded article will further be improved.

The polyamide resin composition of this invention may contain only one type of the black colorant, or may contain two or more types thereof. When two or more types are contained, the total content preferably falls within the above described ranges.

<Other Additives>

The polyamide resin composition of this invention may contain, besides the aforementioned ingredients, any other additive that may commonly be used for polyamide resin, without departing from the spirit of this invention. Such other additive is exemplified by resin other than polyamide resin, mold releasing agent, lubricant, stabilizer, flame retardant, fluorescent brightener, plasticizer, antioxidant, UV absorber, antistatic agent, and fluidity modifier. The total content of such other additives is preferably 5% by mass or less of the polyamide resin composition. As for details of these additives, descriptions in JP-A-2011-57977 and JP-A-2015-129244 may be referred to, the contents of which are incorporated by reference into the present specification.

Such other resin is exemplified by polyester resin, polyphenylene sulfide resin, polyphenylene ether resin, polycarbonate resin, polyarylate resin, phenol resin, and epoxy resin.

<Methods for Manufacturing Polyamide Resin Composition>

Methods for manufacturing the polyamide resin composition of this invention are not specifically limited, but instead may be selectable from known methods for manufacturing thermoplastic resin composition. More specifically, the polyamide resin composition may be manufactured by preliminarily mixing the individual ingredients using any of various mixers such as tumbler and Henschel mixer, followed by melt-kneading using Bumbary mixer, roll mixer, Brabender, single screw extruder, twin screw extruder or kneader.

Alternatively, the polyamide resin composition may be manufactured by feeding the individual ingredients, without being preliminary mixed, or only a part of which being mixed in advance, using a feeder into an extruder, and then melt-kneaded.

Still alternatively, the polyamide resin composition may be manufactured by preliminarily mixing a part of the ingredients feeding the mixture into an extruder to be melt-kneaded therein to prepare a master batch, and then mixing the master batch with the residual ingredients, and again by melt-kneading the mixture.

<Molded Article>

Next, the molded article formed from the polyamide resin composition of this invention will be explained. Pellets obtained by pelletizing the polyamide resin composition of this invention may be molded by a variety of molding methods to give a molded article. Alternatively, the resin composition, having been melt-kneaded in an extruder, may directly be molded into a molded article, without pelletizing.

Geometry of the molded article is not specifically limited, but instead may suitably be selected depending on purposes, for example from forms of tabular, plate, rod, sheet, film, cylinder, ring, circle, ellipse, gear, polygon, irregular profile, hollow profile, frame, box and panel.

Methods for molding the molded article is not specifically limited, allowing employment of any of known methods for molding, which are exemplified by injection molding, injection compression molding, extrusion molding, profile extrusion, transfer molding, hollow molding, gas-assisted hollow molding, blow molding, extrusion blow molding, IMC (in-mold coating) molding, rotational molding, multi-layer molding, two-color molding, insert molding, sandwich molding, foam molding, and pressure molding.

Since the polyamide resin composition of this invention is a resin material featured by high abrasion resistance as well as high mechanical strength, so that the molded article obtained therefrom may suitably be used as a sliding part.

Specific examples of the sliding part include cogwheel, shaft, bearing, various gears and cam of electric equipment, business machine or power equipment; end face material of mechanical seal; valve seat; sealing members such as V-ring, rod packing and piston ring; and shaft, rotating sleeve, piston, impeller and roller of compressor.

EXAMPLES

This invention will more specifically be explained referring to Examples. Materials, amounts of consumption, ratios, details of processes, and procedures of processes may suitably be modified without departing from the spirit of this invention. The scope of this invention is, therefore, by no means limited to the specific Examples below.

<Exemplary Synthesis>

(Synthesis of Polyamide (MP10))

Into a reaction vessel equipped with a stirrer, a partial condenser, a total condenser, a thermometer, a dropping funnel, a nitrogen feeding tube, and a strand die, placed were precisely weighed 12,135 g (60 mol) of sebacic acid, 3.105 g (equivalent to 50 ppm by mass of phosphorus atom in polyamide resin) of sodium hypophosphite monohydrate ($NaH_2PO_2 \cdot H_2O$), and 1.61 g of sodium acetate, followed by thorough replacement with nitrogen gas, and heating up to 170° C. while stirring the system under a small flow rate of nitrogen gas. The molar ratio of sodium acetate and sodium hypophosphite monohydrate was set to 0.67.

To the content, 8,172 g (60 mol) of a 7:3 mixed diamine of meta-xylylenediamine and para-xylylenediamine was added dropwise under stirring, and the system was continuously heated while removing the released water out of the system. After completion of dropwise addition of the mixed xylylenediamine, the inside temperature was kept at 260° C., and the melt polycondensation reaction was allowed to proceed for 40 minutes.

Thereafter, the system was pressurized with nitrogen gas, the polymer was taken out through the strand die, and pelletized to obtain approximately 14 kg of a polyamide resin. The obtained polyamide was found to have a melting point of 215° C., a glass transition temperature of 64.4° C., and a Mn of 14,286.

<Starting Material>

(A) Polyamide Resin (a-1) Semiaromatic polyamide resin: polyamide MXD6 (polycondensate of meta-xylylenediamine and adipic acid), "polyamide MXD6 #6000" from Mitsubishi Gas Chemical Company Inc., m.p.=243° C., glass transition temperature=75° C., Mn=25000

(a-1) Semiaromatic polyamide resin: MP10 synthesized above (a-2) Polyamide resin with melting point higher than that of (a-1) semiaromatic polyamide resin: polyamide 66 (PA66), "Amilan CM3001" from Toray Industries, Inc., m.p.=268° C., glass transition temperature=50° C., Mn=24000

(a-3) Aliphatic polyamide resin with melting point higher than that of (a-1) semiaromatic polyamide resin, and, with glass transition temperature 20° C. or more lower than that of the same: polyamide 6 (PA6), "Zytel 1011FB" from DuPont, m.p.=225° C., glass transition temperature=48° C., Mn=11000

(B) Polyolefin Wax

LDPE-WAX: Hi-WAX720P, from Mitsui Chemicals Inc., Mn=7200

HDPE-WAX: Hi-WAX 800P, from Mitsui Chemicals Inc., Mn=8000

Acid modified LDPE-WAX: Hi-WAX 1105A, from Mitsui Chemicals Inc.,

Mn=1500

(C) Metal Salt

Calcium carbonate: from Nitto Funka Kogyo K. K., aspect ratio=1, particle size=2 μm Barium carbonate: from Junsei Chemical Co., Ltd., aspect ratio=2, particle size=5 μm Inorganic Filler Glass fiber: ECS03T-296GH from Nippon Electric Glass Co., Ltd., number average fiber diameter=10 μm Nucleating Agent Talc: Micron White 5000A, from Hayashi Kasei Co., Ltd., average particle size=7 μm Black Colorant Carbon black: #45, from Mitsubishi Chemical Corporation, DBP oil absorption=53 g/10 $cm^3$ <Methods for Measuring Melting Point and Glass Transition Temperature of Polyamide Resin>

The melting point of polyamide resin was determined based on a temperature at which an endothermic peak observed in DSC (differential scanning calorimetry) becomes deepest in a heating process. The glass transition temperature of polyamide resin was determined based on a peak-top temperature, observed after the polyamide resin was once melted under heating so as to cancel any influences of the thermal history on the crystallinity, and then heated again.

More specifically, a differential scanning calorimeter and approximately 1 mg of the sample polyamide were used, nitrogen gas was fed as an atmospheric gas at a flow rate of 30 ml/min, the sample was heated at a heating rate of 10° C./min from room temperature up to a temperature above a predicted melting point, during which the melting point was determined from the temperature at which an endothermic peak becomes deepest. The molten polyamide resin was then rapidly cooled on dry ice, and re-heated up to a temperature above the melting point at a heating rate of 10° C./min, to determine the glass transition point. "DSC-60" from Shimadzu Corporation was employed as the differential scanning calorimeter.

Example 1

<<Compound of Polyamide Resin Composition>>

The individual ingredients were precisely weighed so that the final composition will be adjusted to the composition listed in Table below (the amounts of the individual ingredients in Table are given in "ratio by mass"), and the ingredients other than the glass fiber were blended using a tumbler, fed from the base of a twin screw extruder (TEM26SS, from Toshiba Machine Co., Ltd.), and allowed to melt. Carbon black was added in the form of 50%-by-mass master batch prepared using the polyamide resin, and then kneaded. After kneading, the glass fiber was fed from the side, and resin pellets (polyamide resin composition) were manufactured. The process was carried out at a preset temperature of the extruder of 280° C.

<<Methods for Measuring Flexural Strength and Flexural Modulus>>

The resin pellets obtained by the aforementioned manufacturing method were dried at 120° C. for 4 hours, and then injection molded using NEX140III from Nissei Plastic Industrial Co., Ltd., to obtain an ISO tensile test piece of 4 mm thick. The process was carried out at a cylinder temperature of 280° C., and a mold temperature of 130° C.

In compliance with ISO178, the ISO tensile test piece (4 mm thick) was measured at 23° C. for flexural strength (in MPa) and flexural modulus (in GPa).

<<Deflection Temperature Under Load (DTUL)>>

In compliance with ISO75-1,2, the ISO tensile test piece (4 mm thick) was measured for deflection temperature under load, under a flexural stress of 1.80 MPa.

<<Specific Wear Amount>>

The resin pellets obtained by the aforementioned manufacturing method were dried at 120° C. for 4 hours, and then injection molded using NS-40 from Nissei Plastic Industrial Co., Ltd., to obtain hollow cylindrical test pieces having a contact area of 2 cm². The process was carried out at a cylinder temperature of 280° C., and a mold temperature of 130° C.

In compliance with JIS K7218(A), friction wear test between these hollow cylindrical test pieces was carried out in an environment with a temperature of 23° C. and a humidity of 50%, at a linear velocity of 100 mm/second, a pressure load of 5 kgf for 20 hours. Specific wear amount of the material was measured for each of the test pieces that were fixed to the apparatus and held on the moving side. The specific wear amount was calculated by dividing the volume loss by abrasion of the test pieces, by the total path length and the pressure load.

<<Limit PV Value>>

The friction wear test between the hollow cylindrical test pieces obtained by the aforementioned molding method were carried out at a linear velocity of 100 mm/second and an initial pressure load of 5 kgf, while increasing the pressure load by 5 kgf for every one minute, to determined limit PV value. The limit PV value was determined by the product of the linear velocity and the pressure load under which the test pieces melt.

<<Appearance>>

The resin pellets obtained by the aforementioned manufacturing method were dried at 120° C. for 4 hours, and then injection molded using NS-40 from Nissei Plastic Industrial Co., Ltd., to obtain hollow cylindrical test pieces having a contact area of 2 cm². The process was carried out at a cylinder temperature of 280° C., and a mold temperature of 130° C. The obtained test pieces were evaluated regarding the appearance as below:

A: looks fully black, without loosened filler;
B: looks poorly black, or with loosened filler; and
C: looks poorly black, and with loosened filler.

TABLE 1

| | | Example 1 | Example 2 | Example 3 | Example 4 | Example 5 | Example 6 | Example 7 | Example 8 |
|---|---|---|---|---|---|---|---|---|---|
| (A)Polyamide Resin | (a-1)MXD6 | 86 | 86 | 86 | 86 | 52 | 69 | 34 | 86 |
| | (a-1)MP10 | | | | | | | | |
| | (a-2)PA66 | 14 | 14 | 14 | 14 | 14 | 14 | 14 | 14 |
| | (a-3)PA6 | | | | | 35 | 17 | 52 | |
| (B)Polyolefin Wax | HDPE-WAX | 11 | | 11 | 11 | 11 | 11 | 11 | 5 |
| | LDPE-WAX | | 11 | | | | | | |
| | Acid-Modified LDPE-WAX | | | | 1 | | | | |
| (C)Metal Salt | CaCO₃ | 11 | 11 | 11 | | 11 | 11 | 11 | 11 |
| | BaCO₃ | | | | 11 | | | | |
| Inorganic Filler | Glass Fiber | 157 | 157 | 157 | 157 | 157 | 157 | 157 | 157 |
| Nucleating Agent | Talc | 3 | 3 | 3 | 3 | 3 | 3 | 3 | 3 |
| Black Colorant | Carbon Black | 2 | 2 | 2 | 2 | 2 | 2 | 2 | 2 |

TABLE 2

| | | Example 9 | Example 10 | Example 11 | Example 12 | Example 13 | Example 14 | Example 15 | Example 16 |
|---|---|---|---|---|---|---|---|---|---|
| (A)Polyamide Resin | (a-1)MXD6 | 86 | 86 | 86 | 86 | 86 | 90 | 55 | |
| | (a-1)MP10 | | | | | | | | 86 |
| | (a-2)PA66 | 14 | 14 | 14 | 14 | 14 | 10 | 45 | 14 |
| | (a-3)PA6 | | | | | | | | |

TABLE 2-continued

|  |  | Example 9 | Example 10 | Example 11 | Example 12 | Example 13 | Example 14 | Example 15 | Example 16 |
|---|---|---|---|---|---|---|---|---|---|
| (B)Polyolefin Wax | HDPE-WAX | 20 | 11 | 11 | 11 | 11 | 11 | 11 | 11 |
|  | LDPE-WAX |  |  |  |  |  |  |  |  |
|  | Acid-Modified LDPE-WAX |  |  |  |  |  |  |  |  |
| (C)Metal Salt | $CaCO_3$ | 11 | 5 | 20 | 11 | 11 | 11 | 11 | 11 |
|  | $BaCO_3$ |  |  |  |  |  |  |  |  |
| Inorganic Filler | Glass Fiber | 157 | 157 | 157 | 86 | 185 | 157 | 157 | 157 |
| Nucleating Agent | Talc | 3 | 3 | 3 | 3 | 3 | 3 | 3 | 3 |
| Black Colorant | Carbon Black | 2 | 2 | 2 | 2 | 2 | 2 | 2 | 2 |

TABLE 3

|  |  | Comparative Example 1 | Comparative Example 2 | Comparative Example 3 |
|---|---|---|---|---|
| (A) Polyamide Resin | (a-1) MXD6 | 86 | 86 |  |
|  | (a-2) PA66 | 14 | 14 | 14 |
|  | (a-3) PA6 |  |  | 86 |
| (B) Polyolefin Wax | HDPE-WAX |  | 11 | 11 |
|  | LDPE-WAX |  |  |  |
|  | Acid-Modified LDPE-WAX |  |  |  |

TABLE 3-continued

|  |  | Comparative Example 1 | Comparative Example 2 | Comparative Example 3 |
|---|---|---|---|---|
| (C) Metal Salt | $CaCO_3$ | 10 |  | 11 |
|  | $BaCO_3$ |  |  |  |
| Inorganic Filler | Glass Fiber | 141 | 141 | 141 |
| Nucleating Agent | Talc | 3 | 3 | 3 |
| Black Colorant | Carbon Black | 2 | 2 | 2 |

TABLE 4

| Test Items |  | Unit | Example 1 | Example 2 | Example 3 | Example 4 |
|---|---|---|---|---|---|---|
| Flexural Strength |  | MPa | 368 | 363 | 362 | 372 |
| Flexural Modulus |  | GPa | 22.5 | 22.4 | 22.1 | 21.0 |
| DTUL |  | ° C. | 226 | 226 | 225 | 224 |
| Specific wear amount ($\times 10^{-2}$ mm$^3$/kgf · km) | Same Material | Fixed Side | 25 | 40 | 35 | 31 |
|  |  | Moving Side | 43 | 35 | 42 | 45 |
|  |  | Total | 68 | 75 | 77 | 76 |
| Limit PV Value |  | mm/sec · kgf | 5000 | 5000 | 5000 | 5000 |
| Appearance |  | Visual Observation | A | A | A | A |

| Test Items |  | Unit | Example 5 | Example 6 | Example 7 | Example 8 |
|---|---|---|---|---|---|---|
| Flexural Strength |  | MPa | 364 | 366 | 349 | 371 |
| Flexural Modulus |  | GPa | 21.0 | 21.2 | 18.1 | 23.1 |
| DTUL |  | ° C. | 216 | 217 | 214 | 227 |
| Specific wear amount ($\times 10^{-2}$ mm$^3$/kgf · km) | Same Material | Fixed Side | 4 | 5 | 2 | 45 |
|  |  | Moving Side | 1 | 3 | 1 | 49 |
|  |  | Total | 5 | 8 | 3 | 94 |
| Limit PV Value |  | mm/sec · kgf | 5500 | 5500 | 5000 | 5000 |
| Appearance |  | Visual Observation | A | A | A | A |

TABLE 5

| Test Items |  | Unit | Example 9 | Example 10 | Example 11 | Example 12 |
|---|---|---|---|---|---|---|
| Flexural Strength |  | MPa | 358 | 370 | 358 | 325 |
| Flexural Modulus |  | GPa | 21.9 | 22.1 | 23.2 | 21.2 |
| DTUL |  | ° C. | 224 | 226 | 226 | 221 |
| Specific wear amount ($\times 10^{-2}$ mm$^3$/kgf · km) | Same Material | Fixed Side | 21 | 42 | 28 | 42 |
|  |  | Moving Side | 27 | 46 | 31 | 41 |
|  |  | Total | 48 | 88 | 59 | 83 |
| Limit PV Value |  | mm/sec · kgf | 5000 | 5000 | 5000 | 4500 |
| Appearance |  | Visual Observation | B | A | A | A |

| Test Items |  | Unit | Example 13 | Example 14 | Example 15 | Example 16 |
|---|---|---|---|---|---|---|
| Flexural Strength |  | MPa | 374 | 374 | 362 | 326 |
| Flexural Modulus |  | GPa | 23.8 | 22.8 | 22.0 | 20.5 |
| DTUL |  | ° C. | 228 | 224 | 228 | 213 |

TABLE 5-continued

| | | | | | | |
|---|---|---|---|---|---|---|
| Specific wear amount | Same Material | Fixed Side | 24 | 33 | 31 | 42 |
| | | Moving Side | 37 | 32 | 37 | 41 |
| ($\times 10^{-2}$ mm$^3$/kgf · km) | | Total | 61 | 65 | 68 | 83 |
| Limit PV Value | | mm/sec · kgf | 5500 | 5000 | 5500 | 4000 |
| Appearance | | Visual Observation | B | A | B | A |

TABLE 6

| Test Items | | Unit | Comparative Example 1 | Comparative Example 2 | Comparative Example 3 |
|---|---|---|---|---|---|
| Flexural Strength | | MPa | 398 | 373 | 320 |
| Flexural Modulus | | GPa | 23.8 | 21.8 | 17.0 |
| DTUL | | °C. | 229 | 226 | 212 |
| Specific wear amount | Same | Fixed Side | 289 | 74 | 2 |
| ($\times 10^{-2}$ mm$^3$/kgf · km) | Material | Moving Side | 278 | 81 | 2 |
| | | Total | 567 | 155 | 4 |
| Limit PV Value | | mm/sec · kgf | 3000 | 5000 | 3000 |
| Appearance | | Visual Observation | A | A | C |

As is clear from these results, the molded article showed large specific wear amount when the polyolefin wax was not mixed (Comparative Example 1). The molded article showed large specific wear amount also when the metal salt was not mixed (Comparative Example 2). The appearance was found to be poor, also when the semiaromatic polyamide resin was not mixed (Comparative Example 3). The limit PV values were also found to be poor.

In contrast, molded articles showing less specific wear amount and keeping high mechanical strength were obtained, when the polyamide resin compositions contained the polyolefin wax and predetermined metal salts (Examples 1 to 4).

INDUSTRIAL APPLICABILITY

The molded article formed from the polyamide resin composition of this invention excels in mechanical strength and abrasion resistance, and is therefore suitably used for gear, shaft, bearing, various gears and cam of electric equipment, business machine or power equipment; end face material of mechanical seal; valve seat; sealing members such as V-ring, rod packing and piston ring; and shaft, rotating sleeve, piston, impeller and roller of compressor.

The contents of Japanese Patent Application Nos. 2016-052307 and 2016-052306 are incorporated by reference into the present specification.

What is claimed is:

1. A polyamide resin composition comprising:
(A) polyamide resin,
(B) polyolefin wax,
(C) at least one metal salt selected from CaCO$_3$ and/or BaCO$_3$, and
glass fiber,
    the (A) polyamide resin containing (a-1) a polyamide resin that comprises a structural unit derived from diamine and a structural unit derived from dicarboxylic acid, 70 mol % or more of the structural unit derived from diamine being derived from at least either meta-xylylenediamine or para-xylylenediamine, and 70 mol % or more of the structural unit derived from dicarboxylic acid being derived from a straight chain aliphatic α, ω-dicarboxylic acid having 4 to 20 carbon atoms, and
    50 mol % or more of the structural unit derived from diamine being derived from meta-xylylenediamine;
the (B) polyolefin wax being contained in an amount of 4 parts by mass or above and 25 parts by mass or below, per 100 parts by mass of the (A) polyamide resin; and
the mass ratio of the glass fiber and the metal salt is 86:11 to 157:5.

2. The polyamide resin composition of claim 1,
wherein the (C) metal salt has a particle form with an aspect ratio of smaller than 5.

3. The polyamide resin composition of claim 1,
wherein the (C) metal salt has a particle form with an aspect ratio of smaller than 5, and is calcium carbonate.

4. The polyamide resin composition of claim 1, further comprising:
(a-2) polyamide resin having a melting point higher than a melting point of the (a-1) polyamide resin that comprises the structural unit derived from diamine and the structural unit derived from dicarboxylic acid.

5. The polyamide resin composition of claim 4,
wherein the (a-2) polyamide resin is polyamide 66.

6. The polyamide resin composition of claim 1,
wherein the glass fiber is present in an amount of 10 to 200 parts by mass per 100 parts by mass of the (A) polyamide resin.

7. The polyamide resin composition of claim 1, further comprising:
0.1 to 10 parts by mass of a nucleating agent, per 100 parts by mass of the (A) polyamide resin.

8. The polyamide resin composition of claim 1, further comprising:
0.1 to 10 parts by mass of a black colorant, per 100 parts by mass of the (A) polyamide resin.

9. The polyamide resin composition of claim 1,
wherein the (A) polyamide resin further comprises (a-3) aliphatic polyamide resin having a melting point lower than a melting point of the (a-1) polyamide resin that comprises the structural unit derived from diamine and the structural unit derived from dicarboxylic acid, and having a glass transition temperature 20° C. or more lower than a glass transition temperature of the (a-1) polyamide resin that comprises the structural unit derived from diamine and the structural unit derived from dicarboxylic acid.

10. The polyamide resin composition of claim 1, wherein the metal salt has a particle size of 0.1 to 50 μm.

11. The polyamide resin composition of claim 8, wherein the black colorant is a carbon black having a DBP oil absorption of 40 to 60 g/cm$^3$.

12. The polyamide resin composition of claim 4, which has a ratio by mass of the (a-1) polyamide resin that comprises the structural unit derived from diamine and the structural unit derived from dicarboxylic acid and the (a-2) polyamide resin, namely (a-1)/(a-2), of 3.0 to 8.0.

13. The polyamide resin composition of claim 9,
which further comprises (a-2) polyamide resin having a melting point higher than a melting point of the (a-1) polyamide resin that comprises the structural unit derived from diamine and the structural unit derived from dicarboxylic acid;
has a total content of the (a-1) polyamide resin that comprises the structural unit derived from diamine and the structural unit derived from dicarboxylic acid and the (a-2) polyamide resin and the (a-3) aliphatic polyamide resin accounts for 95% by mass or more; and
has a ratio by mass of the (a-1) polyamide resin that comprises the structural unit derived from diamine and the structural unit derived from dicarboxylic acid and the (a-3) aliphatic polyamide resin, namely (a-1)/(a-3), of 0.5 to 5.0.

14. A molded article formed by using the polyamide resin composition described in claim 1.

15. A sliding part formed by using the polyamide resin composition described in claim 1.

16. The polyamide resin composition of claim 1,
wherein the (C) metal salt has a particle form with an aspect ratio of smaller than 5, and is calcium carbonate,
the polyamide resin composition further comprising (a-2) polyamide resin having a melting point higher than a melting point of the (a-1) polyamide resin that comprises the structural unit derived from diamine and the structural unit derived from dicarboxylic acid.

* * * * *